(No Model.) 8 Sheets—Sheet 1.

O. B. SHALLENBERGER.
METHOD OF MEASURING ALTERNATING ELECTRIC CURRENTS.

No. 449,001. Patented Mar. 24, 1891.

Fig. 1.

WITNESSES: INVENTOR,
Oliver B. Shallenberger.
Pope, Edgecomb & Leny.
Att'y.

(No Model.) 8 Sheets—Sheet 2.

O. B. SHALLENBERGER.
METHOD OF MEASURING ALTERNATING ELECTRIC CURRENTS.

No. 449,001. Patented Mar. 24, 1891.

Fig. 2.

WITNESSES:
Herbert B. Shallenberger
W. H. McCullough

INVENTOR,
Oliver B. Shallenberger.
Pope, Edgecomb & Seny.
Att'y.

THE NORRIS PETERS CO., PHOTO-LITHO., WASHINGTON, D. C.

(No Model.) 8 Sheets—Sheet 3.
O. B. SHALLENBERGER.
METHOD OF MEASURING ALTERNATING ELECTRIC CURRENTS.
No. 449,001. Patented Mar. 24, 1891.

WITNESSES: INVENTOR, (No Model.)  8 Sheets—Sheet 4.
O. B. SHALLENBERGER.
METHOD OF MEASURING ALTERNATING ELECTRIC CURRENTS.

No. 449,001.  Patented Mar. 24, 1891.

Fig.4.

WITNESSES:  INVENTOR, (No Model.) 8 Sheets—Sheet 5.
O. B. SHALLENBERGER.
METHOD OF MEASURING ALTERNATING ELECTRIC CURRENTS.
No. 449,001. Patented Mar. 24, 1891.

Fig. 5.

WITNESSES:

INVENTOR, (No Model.) 8 Sheets—Sheet 8.
O. B. SHALLENBERGER.
METHOD OF MEASURING ALTERNATING ELECTRIC CURRENTS.
No. 449,001. Patented Mar. 24, 1891.

Fig. 8.

WITNESSES: INVENTOR,

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

METHOD OF MEASURING ALTERNATING ELECTRIC CURRENTS.

SPECIFICATION forming part of Letters Patent No. 449,001, dated March 24, 1891.

Application filed December 26, 1888. Serial No. 294,568. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in the Method of Measuring Alternating Electric Currents, (Case No. 237,) of which the following is a specification.

My invention relates to certain improvements in the method of measuring the electric currents consumed in doing useful work upon alternating-current circuits.

The object of the invention is to provide a method whereby a meter may be caused to register only the current consumed in doing useful work, while it is not operated by the leakage-current which may flow in the circuits, or by such current as may be consumed in any other operation than doing useful work. Such a method of measuring currents is especially desirable in connection with circuits employing electric converters or transformers, for the reason that there is practically more or less leakage through the primary coils of the converters even when their secondary circuits are open, and therefore unless special means are employed to guard against it the meter placed in the primary circuit would record the flow of such currents and might be continually operated, even though no useful work were being done.

My invention consists in so organizing a meter designed to be connected in the primary or supply circuit or to measure the current flowing through it that it will commence to operate only when the flow of current through the circuit to which it is applied exceeds the leakage of the circuit or of the converters connected in the circuit, and at the same time will give an accurate record of all the current consumed in doing useful work.

There are several different plans which may be adopted in carrying out the invention, certain of which will be described in connection with the accompanying drawings.

Referring to the figures, G represents any suitable source of alternating, intermittent, or pulsatory electric currents, and $L'$ $L^2$ conductors leading from the respective poles thereof to a work-circuit W. In this work-circuit any required number of converters or transformers are connected, as shown at $C'$ $C^2$ $C^3$. The primary coils of these converters are connected in multiple arc, and their secondary coils supply current to translating devices $d$, which may be placed in circuit or removed therefrom, as required, in any convenient well-known manner. More or less current will pass through the primary coils of the converters even when their secondary circuits are open. This current is usually termed the "leakage-current." The percentage of current thus consumed is very small; but it becomes appreciable when several converters are connected in multiple. It is evident that when a consumer pays for the current by reference to a meter it would not be proper to record upon the meter the current consumed by the leakage of the converters, but only that used in doing useful work in the secondary circuits. To avoid this the meter is constructed so that it will respond only when this leakage upon the circuit to which it is applied is exceeded, or, in other words, only when current is allowed to flow through the secondary coils of one or more of the converters.

The invention is applicable to various different forms of meters; but for convenience of description it will be set forth more particularly in connection with an electric meter of the construction described in certain patents issued to me August 14, 1888, Nos. 388,003 and 388,004. The application of the invention to other forms of meters than this will be apparent when considered in connection with the descriptions hereinafter given.

Figure 1:
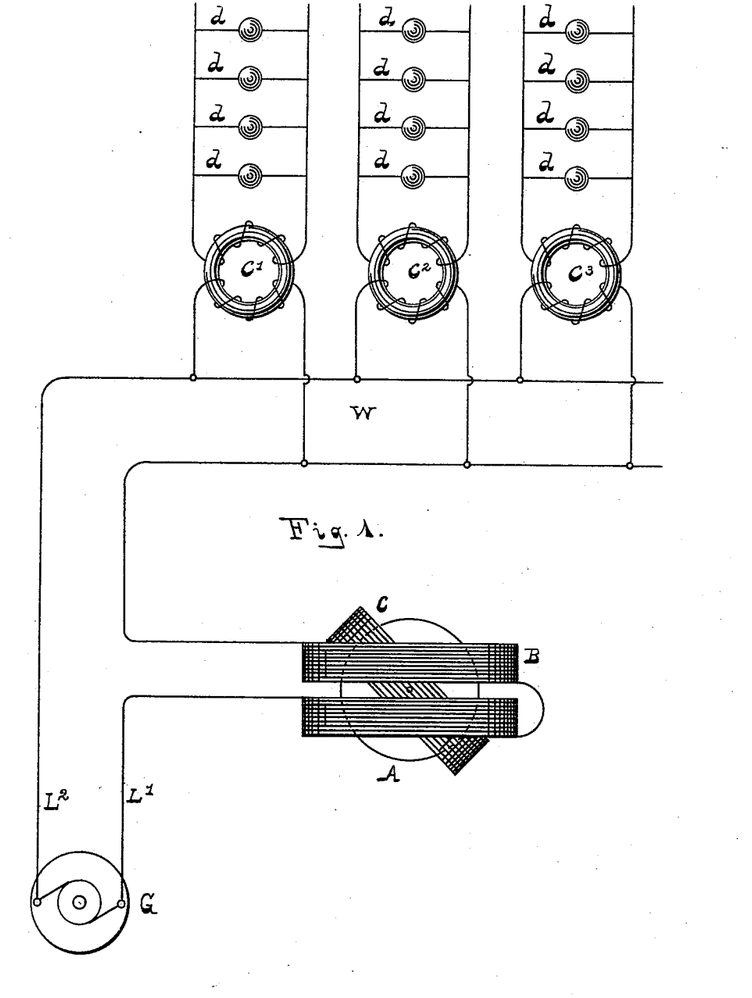
Figure 1 illustrates an organization in which the meter itself is so constructed that the current necessary to start it exceeds the leakage of the circuit to which it is applied.

In the meter described in the patents referred to the armature A is revolved by the resultant effects of currents traversing two coils B and C. The coil B is of insulated conducting material, and in the organization shown in Fig. 1 it is connected in the main-line conductor L'. Currents are induced in the conductor C in this instance by currents flowing in the conductor B. The armature A tends to revolve under the influence of the lines of polarization established by the currents traversing these two coils. By properly proportioning the coils and relating them to each other and to the armature the current required to overcome the friction or inertia of the meter may be made to exceed that which will leak through the primaries of the converters when no current is flowing. Thus if the leakage in the present instance is one-tenth of an ampère for each converter and there are three converters connected in multiple arc, then the meter is so constructed that it will not respond to a current of three-tenths of an ampère flowing through the work-circuit. This current, however, is sufficient to place the meter in condition to be started upon the slightest increase of current. Therefore, if the secondary circuit of any converter be closed through one or more translating devices, the meter will immediately respond and record the current flowing in the main line in excess of that flowing when no work is being done in the secondaries. In other words, the current required to set the meter in motion and to cause it to register is equal to or slightly exceeds that which leaks through the feeders when no work is being done in the secondary circuit. As the current flowing increases, the armature will rotate with increasing velocity, and as the velocity increases the rotating effect produced by a given increase of current also increases.

In order that the indications of the meter may be proportional to the current supplied to the work-circuit, a retarding effect must be introduced, which will increase in value by the same law as the increase in the rotating effect. The desired retardation may be obtained by applying to the shaft vanes or fans N, (see Fig. 3,) the retarding effect of which will increase under increasing velocities. The revolution of the armature may be recorded upon the dials in the manner described in the patents referred to.

Figure 2:
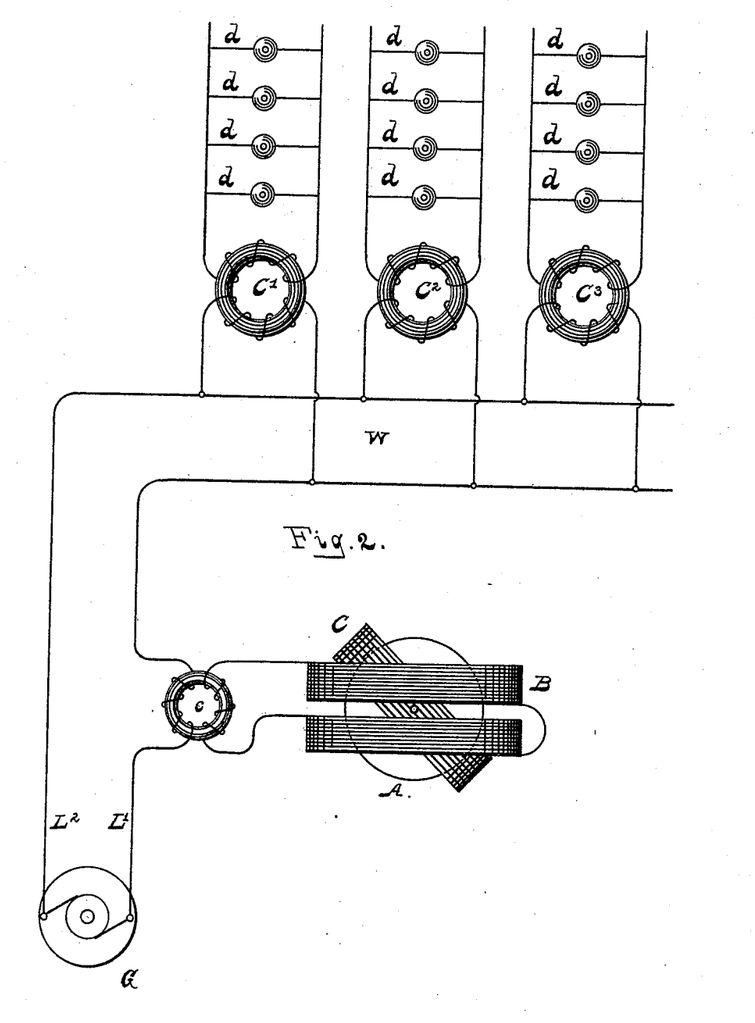
Fig. 2 illustrates an organization in which a converter is introduced between the meter and the circuit. This converter requires a current having a definite relation to the leakage-current to place it in such a magnetic condition as to yield current to the meter.

In Fig. 2 another plan of carrying out the invention is illustrated, in which, instead of constructing the meter itself so that its starting-current is equivalent to the leakage, the current is delivered to the meter through a converter c, which is constructed to have a predetermined leakage somewhat less than the sums of the leakages of the several converters $C'$ $C^2$ $C^3$ connected in the work-circuit, while the meter itself is constructed to require a starting-current equivalent to the difference between the leakage of the converter C and the sum of the leakages of the several work-circuit converters. Thus if the leakage in the work-circuit amounts to four-tenths of an ampère the converter c may have a leakage of two-tenths of an ampère—that is to say, a current of two-tenths of an ampère may flow through its primary before any current is induced in the secondary. Then when a current of four-tenths of an ampère is flowing through the primary a current of two-tenths will be induced in the secondary, providing that the ratio of conversion of the converter is unity. The meter itself should then be so constructed that a current of two-tenths of an ampère would place it in readiness to start upon any increase of current. The operation of the apparatus would then be essentially the same as that already described in connection with Fig. 1. In this organization, however, another factor must be taken into consideration—namely, the varying percentage of leakage in the converter c—for as the current flowing to the work-circuit increases, the leakage through the converter c also increases since it is connected in series with the work-circuit, and is consequently subjected to a higher difference of potential. The current delivered to the meter therefore is not directly proportionate to the current flowing, and it becomes necessary to compensate in the meter for this increasing leakage of the converter c. This may be accomplished by properly proportioning the elements of the meter itself. Thus the armature may be constructed to revolve with greater rapidity under given increments of current as the velocity increases—that is to say, the torque may be made to increase in greater ratio relatively to the current than the retarding effect relatively to the speed. This result may be accomplished, for example, by decreasing the magnetic saturation of the armature. As the armature approaches more nearly to a condition of saturation the torque increases less rapidly.

Figure 3:
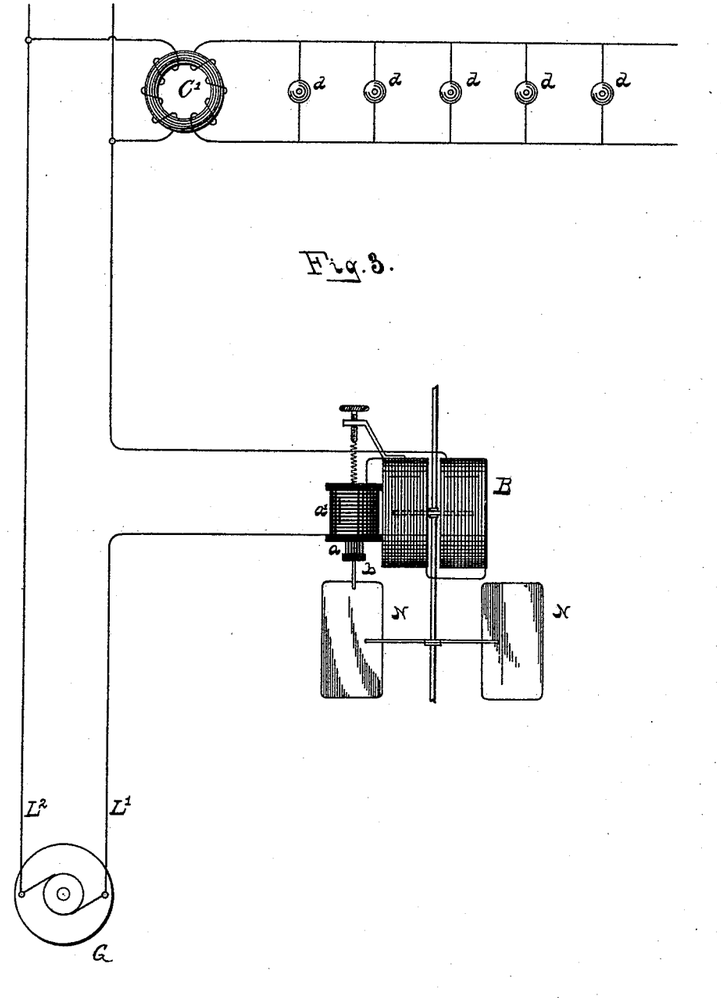
Fig. 3 illustrates an organization in which a mechanical detent is employed for arresting the movement of the meter until a current of predetermined value is flowing.

In the organization shown in Fig. 3 the meter is constructed to be normally held at rest by a stop of any suitable character, which will be thrown away from the armature when the current flowing through the meter exceeds the leakage of the work-circuit. In this instance the stop is shown at $b$ and consists merely of an arm intercepting the path of the fans N. It is carried in this instance by the movable core $a$ of a solenoid $a'$, which is connected in series with the coils B. As the current through the coils B and the solenoid increases, the core is drawn farther into the solenoid, and thus the stop is withdrawn from the path of the vanes or some other moving part of the meter when the current attains the proper value. This construction does not necessitate any initial leakage on the part of the meter itself. Other methods of applying the stop will be evident.

Figure 4:
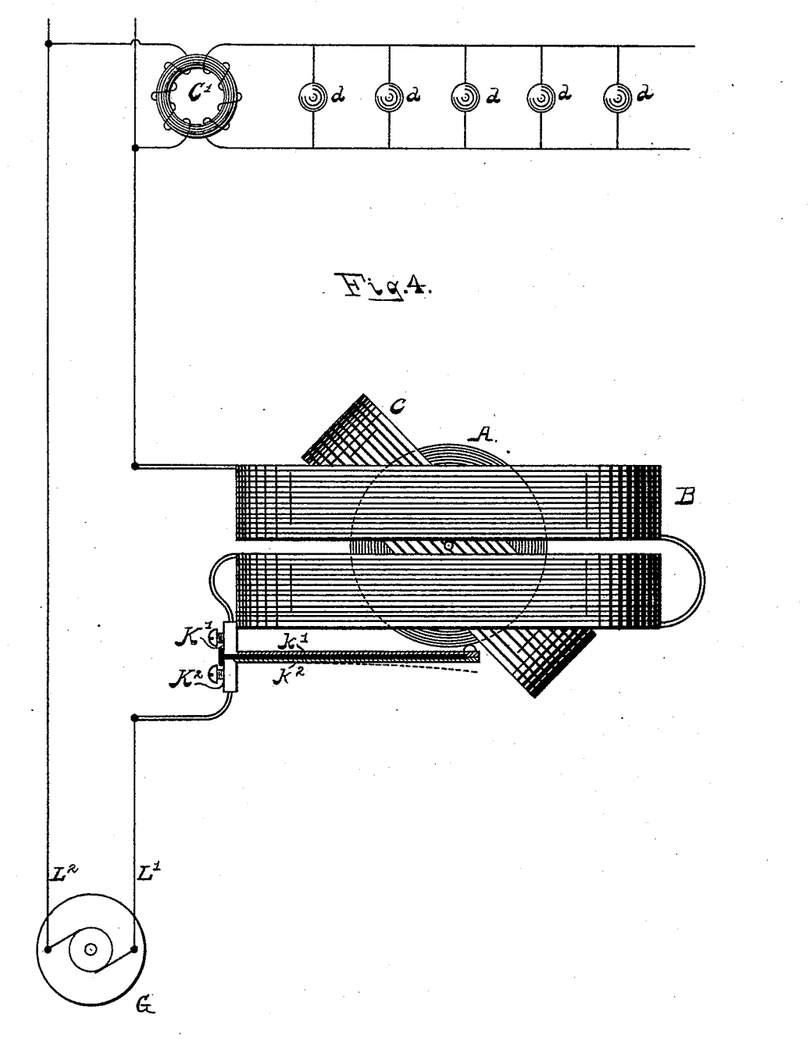
Fig. 4 illustrates the application of a thermostat for arresting the meter until a current of a predetermined value is flowing.

In Fig. 4 an organization is illustrated wherein a thermostatic device is employed for arresting the motion of the meter until the current has reached a predetermined value. The thermostatic device consists of two strips of metal $k'$ $k^2$, having different rates of expansion under the influence of heat. The strips are insulated from each other throughout their lengths and secured, respectively, to plates $K'$ $K^2$ at one end. The opposite ends are in electrical connection with each other. The two strips are connected in circuit in series, the conductor $L'$ being led to the block $K'$, while the block $K^2$ is connected with the coils B. When little or no current is passing through the thermostatic device, a detent $k$, carried at the free end, rests against the armature and prevents it from revolving. As the current increases, however, and the leakage of the current is exceeded, sufficient heat is developed by its passage through the thermostatic strips to cause them to bend away from the armature, thus releasing it and allowing the meter to operate. It will be observed that the thermostatic device is operated by the heat developed in itself by the current passing through the two strips.

Figure 5:
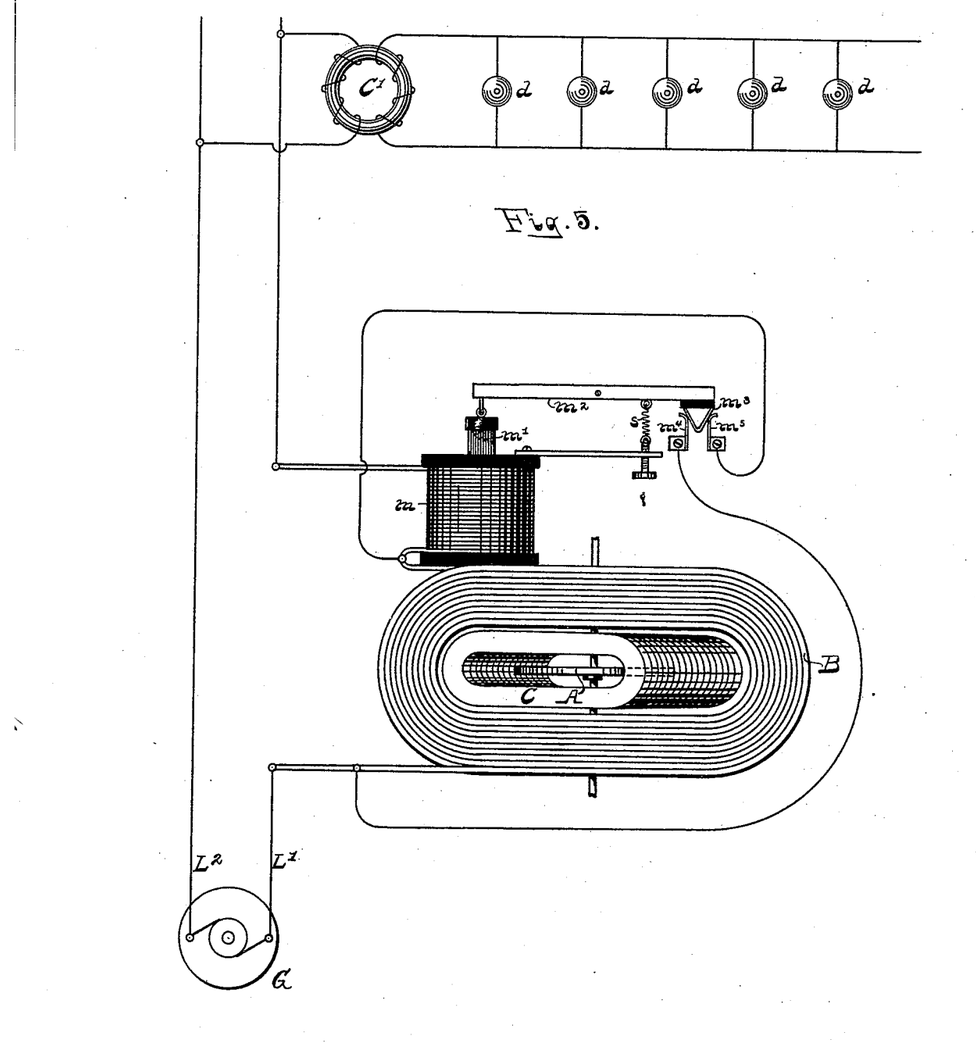
Fig. 5 shows a plan of short-circuiting the meter-coils, except when the current exceeds a predetermined amount.

In Fig. 5 an organization is illustrated wherein the meter is short-circuited so long as the leakage-current or the current which it is not desired to record is flowing through the circuit. This is accomplished by connecting an electro-magnet or solenoid $m$ in series with the meter. This solenoid is provided with a core $m'$, carried upon one end of a movable lever $m^2$, the other end of which carries a circuit-closing point $m^3$. This point passes between two contact-springs $m^4$ and $m^5$, which are respectively connected with the terminals of the meter. When the current exceeds a predetermined value, the core is drawn into the solenoid against the opposition of a spring $s$ a sufficient distance to separate the circuit-closing point from the contact-points, and thus interrupt the shunt-circuit around the meter and allow it to operate. The solenoid still remains in circuit, and thus holds the shunt-circuit open.

Figure 6:
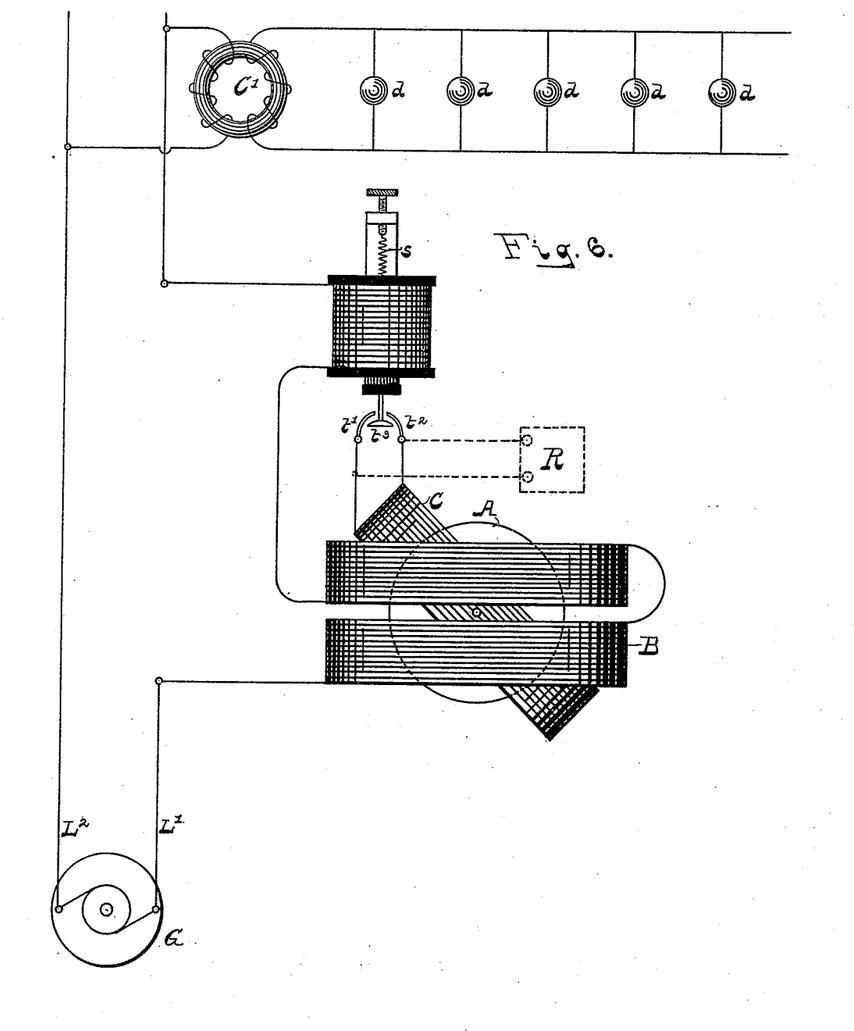
Fig. 6 shows a plan of employing a resistance for diminishing the torque exerted by the current on the disk until a current of a predetermined value is reached.

In Fig. 6 an organization is illustrated wherein the secondary coil C is closed through a resistance R. The resistance opposes the passage of current through the coil to such an extent that normally the meter will not operate. When, however, the current rises in value sufficiently to draw the core within the coil, a contact-piece $t^3$ closes the circuit-connections between the plates $t'$ and $t^2$, thus completing the circuit of the coil C independently of the resistance R, whereupon the meter operates.

Figure 7:
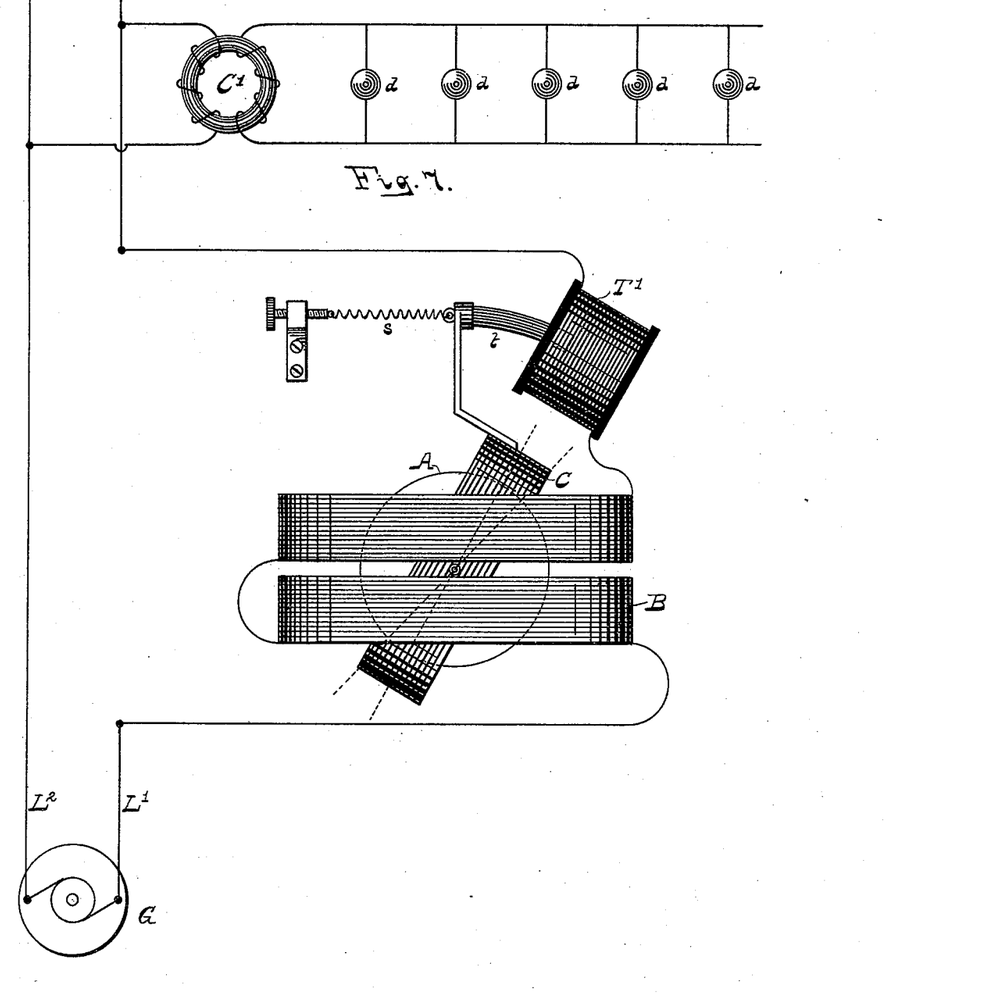
Fig. 7 illustrates a method of securing an automatic adjustment of the relative positions of two actuating-coils of a special form of meter in such manner that it will start only when a predetermined current flows.

In Fig. 7 an automatic adjusting device for the coil C is shown. The plan in this instance is to automatically vary the angle of the coil C with reference to the coil B. The coil C normally stands in such position that the inductive effects upon it from currents traversing the coil B are such that the meter will require a large current to start it. A solenoid $T'$ is included in series with the coil B, and its core $t$ is attached to an arm carried by the movable secondary coil C. As the current in the main circuit increases, the core is drawn a greater distance into the solenoid, thus turning the coil upon its axis into a position more favorable for receiving currents by induction and for acting upon the armature of the meter. If the secondary coil is made to turn very freely on its supports, the coil $T'$ and core $t$ may be dispensed with. The movement will then take place from the direct action of the coils B.

Figure 8:
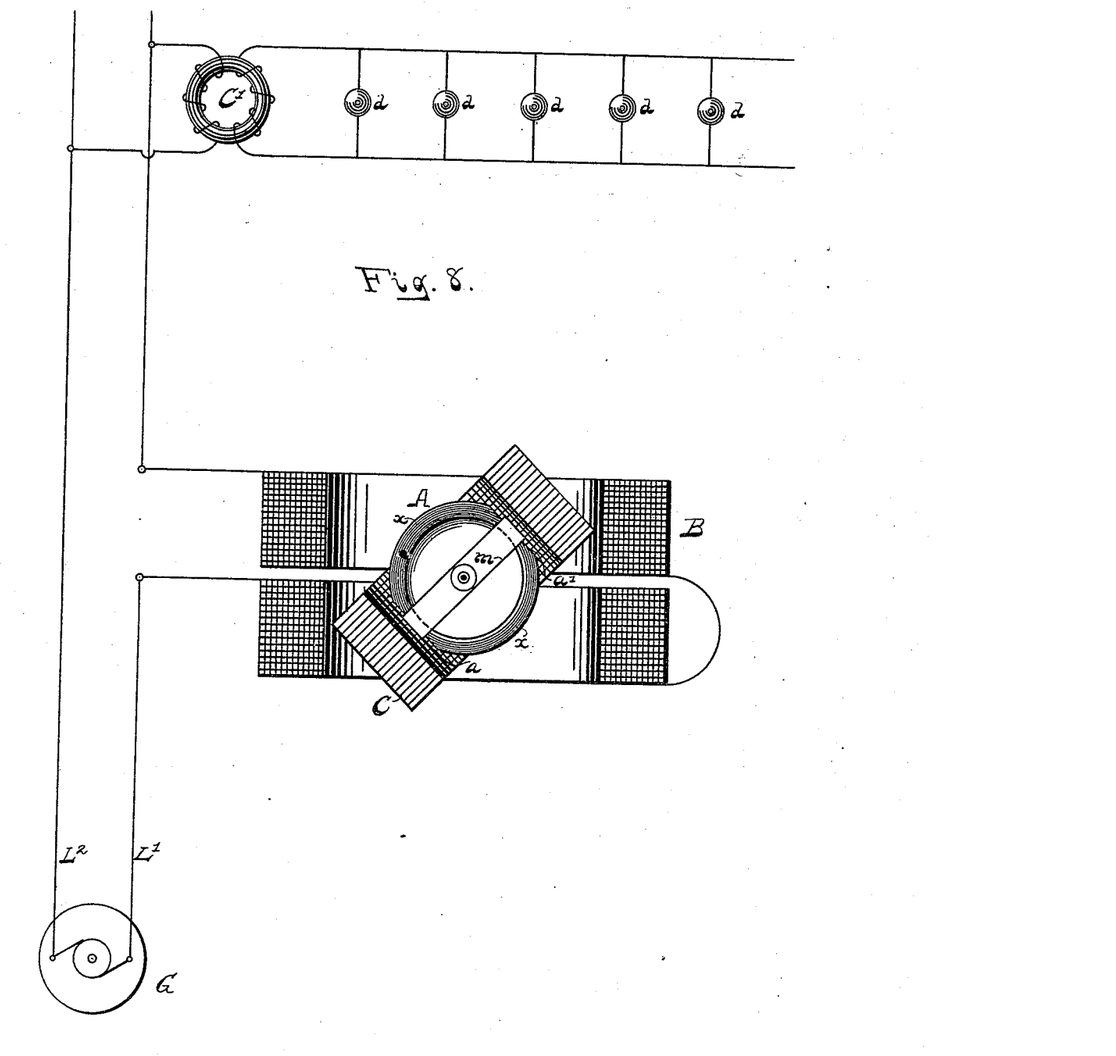
Fig. 8 illustrates a special construction of the armature of a meter which requires a current of a definite value to start it.

Fig. 8 represents an organization wherein the armature is so constructed that when at rest it has a tendency to stand in a given position with reference to the coil C, and while in that position it requires a predetermined initial current to set it in motion. The inertia once being overcome, the armature will continue to revolve with increasing rapidity as the current increases. To accomplish this the armature is cut away upon two sides, as shown at $a'$ $a^2$, so that the diameter is greater in the direction $x$ $x$. The armature will therefore stand in the position shown in the drawings so long as the current flowing is insufficient to overcome the tendency of the armature to set itself in this position. This tendency may be augmented by placing a copper band $m$ around the armature in such direction that the polar line established by the induced currents circulating in it will be in the direction $x$ $x$. The effect of this is to lessen the torque exerted upon the armature so long as it stands in the position shown in the drawings; but when once set in revolution it will continue to revolve readily under the influence of the current flowing.

It is evident that the invention here described and claimed is applicable to other meters than that described, and it is evident, also, that different methods of applying the invention to the particular meter here shown may be adopted; but those already described are sufficient for a full and complete understanding of the invention.

I claim as my invention—

1. The hereinbefore-described method of measuring the currents consumed in doing useful work in alternating-current electric circuits, which consists in employing the leakage-current of the circuit to overcome the inertia of the meter and in operating the meter by the current flowing in excess of such leakage-current.

2. The hereinbefore-described method of measuring the currents consumed in doing useful work in an electric circuit, which consists in employing the leakage-current of the circuit to place the meter in condition to be operated, operating the meter by the current flowing in excess of such leakage-current, and in causing the rate of movement of the meter to be proportionate to the current consumed in operating the translating devices by causing the rate of movement thereof to increase under an increase of current by an amount proportionately greater than the increase of current sufficient to compensate for the varying ratio between the leakage in the meter and the current flowing.

In testimony whereof I have hereunto subscribed my name this 20th day of December, A. D. 1888.

OLIVER B. SHALLENBERGER.

Witnesses:
CHARLES A. TERRY,
W. D. UPTEGRAFF.